INVENTOR.
JOHN C. SIMS, JR.
BY
Kenway, Jenney + Hildreth
ATTORNEYS

INVENTOR.
JOHN C. SIMS, JR.
BY
Kenway, Jenney & Hildreth
ATTORNEYS 3,299,414
Patented Jan. 17, 1967

3,299,414

PHASE MODULATED BINARY MAGNETIC RECORDING AND REPRODUCING SYSTEM

John C. Sims, Jr., Sudbury, Mass., assignor to Anelex Corporation, Boston, Mass., a corporation of New Hampshire Filed Feb. 3, 1964, Ser. No. 341,969
10 Claims. (Cl. 340—174.1)

My invention relates to magnetic recording and reproduction, and more particularly to a novel system for recording and reproducing information in which a new method of phase modulation is employed.

The basic problem in the reproduction of information recorded on a magnetic surface, such as the surface of a drum or a disc in a random access disc file or the like, arises from the phase and amplitude distortion which occur. Numerous modulating and detection techniques have been devised for recording and reproducing magnetic signals, but so far as I am aware they have all been subject to difficulties arising from this cause. For example, a common technique currently in use involves phase modulation to produce a signal in which binary zeros are represented by a cycle of alternating voltage of one phase and binary ones are represented by a cycle of voltage of the same frequency and 180 degrees out of phase with the other signal. The two signal phases are obtained from an oscillator during recording. In reproducing the information so recorded, a delay line correlator or a flywheel oscillator is used to discriminate between the two phases of the recovered signal. In a system employing this technique, no difficulty is encountered in discriminating between the two phases on playback, but a difficulty does exist in determining which phase represents ones and which phase represents zeroes. In order to overcome this difficulty, a train of signals is recorded, at the start of each message or block of data, which is used in reproduction to lock the oscillator or correlator into the proper phase relationship. The necessity for recording this starting train of signals results in the loss of storage space which could otherwise be used for information. In addition, correct recovery of the recorded information depends on the phase memory of the oscillator or correlator; if this phase memory becomes lost during the reading of data due to imperfections in the recorded signal or in the record medium, then the data in the balance of the message will be complemented or scrambled. It is the object of my invention to facilitate the accurate recording and reproduction of information with a minimum amount of record space devoted to the storage of information merely serving to identify the beginning of a record.

Briefly, a recording and reproducing system in accordance with my invention is characterized by the representation of one truth value of a set such as zero and one by an alternating voltage of fixed frequency, having a period equal to one bit time. The occurrence of the other truth value in a train of signals is represented by inverting the phase of the recording voltage, once for each occurrence of that truth value. Specifically, for example, logical zeros may be represented by a voltage of predetermined frequency, each cycle of which would represent a logical zero in a train of data to be recorded. A one occurring in a train of data would be represented by inverting the phase of the applied voltage, resulting in a half-cycle of one-half the predetermined frequency. This half-cycle would be followed by another cycle, at the predetermined frequency but 180 degrees out of phase with the last cycle of that frequency, if the next information bit was a zero, but would be followed by another phase inversion if the next bit was a one.

Apparatus in accordance with my invention for producing signals modulated in the manner just described may comprise a first source of voltage at the predetermined frequency, a second source of voltage at the same frequency, but 180 degrees out of phase, and gating means for applying one or the other of these signals to a conventional recording head, for storage on a conventional magnetic record medium. The gating means is controlled by a train of data to be recorded to change from one source to the other each time a logical one is encountered in the input data train.

Information stored on the record medium may be reproduced by a conventional transducer, followed by conventional means for squaring the reproduced signal and regulating its magnitude. Apparatus is provided for decoding the reproduced and regulated signal, comprising means for deriving two delayed signals from it; one signal is delayed by an amount greater than one-half and less than one cycle at the basic frequency, and the other signal is delayed by an amount greater than the first but less than a whole cycle of the basic frequency. Apparatus is provided for combining the signals produced in this way to reproduce the recorded data in a desired form, and at the same time to produce a reconstituted train of clock pulses in time with the reproduced data signals. This apparatus is effective regardless of the phase and amplitude distortion which may take place during recording, and no special signals are needed to indicate the beginning of a message for interpretation purposes. If it is desired to provide a start signal for switching purposes in apparatus utilizing the output of the reproducing system, this may be accomplished by recording one bit which is of the same logical value for each message. For example, if a logical one is always recorded at the beginning of a train of signals, the occurrence of this one at the output of the reproducing system may be used to switch the decoded train following it into a desired channel.

The apparatus of my invention will best be understood with reference to the following detailed description, together with the accompanying drawings, of a preferred embodiment thereof.

Figure 1:
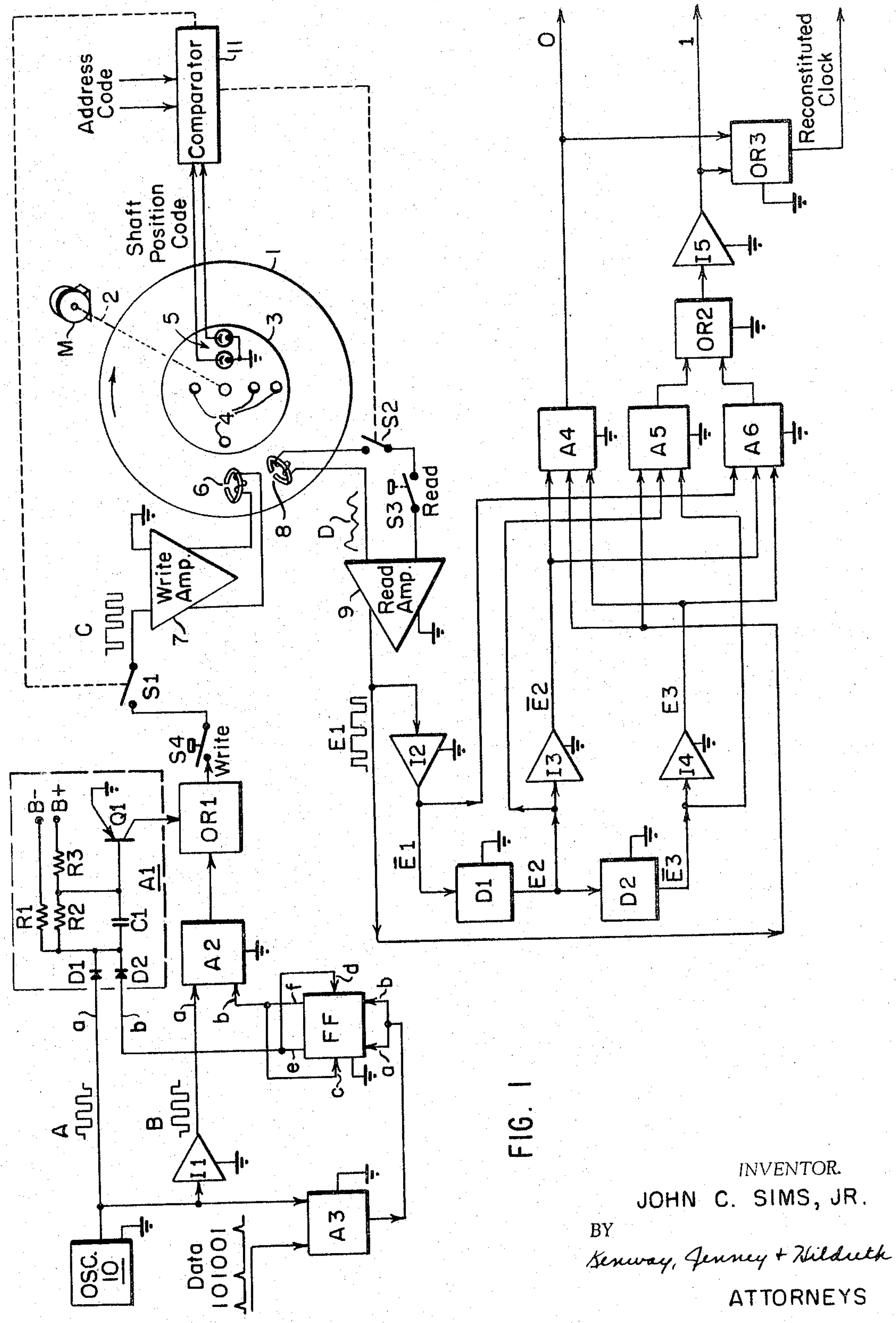
FIG. 1 is a schematic wiring diagram of a magnetic recording and reproducing system in accordance with my invention.

Referring now to FIG. 1, I have shown a recording and reproducing system comprising a recording medium here shown as a magnetically coated disc 1, arranged to be rotated at constant speed by the output shaft 2 of a conventional motor M. Also mounted on the output shaft 2 may be a disc 3 provided with coded apertures such as 4, arranged to cooperate with photocells such as 5 and lamps, not shown, positioned to illuminate the photocells through the apertures when the latter are in register with the photocells to produce a shaft position code. This code may be used in a manner known in the art to indicate the angular position of the disc on the shaft 2, with respect to a reference position. Signals produced by the photocells 5 may be employed to gate the recording and reproducing apparatus to be described, in a manner which will be apparent to those skilled in the art, so that data may be recorded on and reproduced from a selected record track on the disc 1. For example, as indicated schematically in FIG. 1, the shaft position code may be compared with an address code in a conventional comparator 11, to control the operation of electronic switches schematically indicated at S1 and S2 to enable the recording and reproducing channels, respectively, during desired intervals. Alternatively, the switches S1 and S2 may be manually controlled.

Mounted adjacent the surface of the disc 1 for relative rotation with respect thereto is a recording transducer generally designated at 6 having an input coil connected to the output terminals of a conventional write amplifier 7. A reproducing transducer 8 is located adjacent the surface of the disc 1, at the same radius as the recording transducer 6, and has an output coil connected to the input terminals of a read amplifier 9, in series with the switch S2 and a read switch S3, the latter representing any conventional manually or electronically controlled switch for establishing a reproducing interval which may be different from the recording interval. The read amplifier 9 may be of conventional construction, of the type adapted to produce a squared output voltage of reference magnitude in response to an input voltage of varying magnitude.

An input signal to the write amplifier 7 is provided by an OR gate OR1 of conventional design, which serves to apply the output of either a gate A1 or a gate A2 to the input terminals of the write amplifier 7. The switch S2 and a write switch S4, which may be manually or electronically actuated to establish a recording interval, are connected in series with the output terminals of the gate OR1 as shown. Alternatively, all of the switches S1, S2, S3 and S4 may be omitted, and the system operated as a delay line having a time constant determined by the relative location of the recording and reproducing transducers 6 and 8 and the speed of the motor M.

The gate A1, as well as the other gates designated by A followed by an identifying numerical suffix, may be conventional NOR gates. Those skilled in the art will appreciate that conventional AND gates could also be employed, with suitable selection of potentials representing the logical truth values of the data. As shown for the gate A1, these gates may comprise a diode such as the diode D1 and D2 for each desired input connected in the biasing circuit for the base of a transistor Q1, which has its emitter grounded. Application of ground potential to the input terminals of one or more of the diodes will cause conduction through the resistor R1 from the negative supply source, reverse-biasing the base-emitter junction to cut off the transistor. With a negative voltage or no voltage applied to all of the input terminals of the diodes such as D1 and D2, the transistor Q1 will be forward-biased, causing it to conduct and bringing its collector to ground potential. In operation, when ground potential is applied to the input terminal *b* of the gate A1, the transistor Q1 will remain cut off regardless of the voltage applied to the input terminal *a*, and when a negative potential is applied to the input terminal *b*, the gate is enabled to pass a waveform applied to its input terminal *a* as a series of ground levels occurring when the input voltage goes negative. Alternatively, the collector of the transistor Q1 may be returned to a suitable voltage source through a load resistor, so that the output voltage will assume one of two voltage levels in dependence on the input conditions. As another alternative, all of the polarities and diode connections in the gate A1 could be reversed, and the transistor Q1 changed to an npn type, resulting in a gate producing a ground level output when both input terminals are open-circuited, or have a positive potential with respect to ground, and an open-circuited output when a negative potential is applied to either input terminal. Such a gate may be thought of as an AND gate if logic 1 is represented either by an open-circuit condition or the input potential which would block the diodes, and both logic zero and "no information" are represented by the potential causing the transistor to cut off. In fact, the gates here shown function in the apparatus of any invention in such a manner that they could be replaced by conventional AND gates of various known constructions without departing from the scope of my invention. Specifically, the principle to be applied in replacing the NOR gates shown by AND gates is that "Not A Nor B" is the same as "$\overline{A}$ and $\overline{B}$", where A and B are binary digits and the barred symbol represents "NOT."

As will appear, the gates A1 and A2 are selectively enabled to pass the voltage inputs applied to their input terminals *a* through the gate OR1 to the write amplifier 7. Modulating signals are applied to the input terminal *a* of the gate A1 from the output of an oscillator 10, which may be of any conventional design suitable for producing an alternating voltage of a predetermined fundamental frequency, such as 500 kilocycles per second, of square waveform and constant magnitude. The waveform of the output of the oscillator 10 is identified as A in FIGS. 1 and 2. A second wave train B, of the same frequency and magnitude as the train A but inverted in phase, is provided by an inverter I1 connected to the output of the oscillator 10. This voltage B is applied to the input terminal *a* of the gate A2.

A gate A3 has one input terminal connected to the output of the oscillator 10, and a second input terminal adapted to be energized by a train of signals representing data to be recorded. The date is represented by a negative voltage, for example—3 volts, for a logical zero, and by ground potential for a logical one. The gate A3 is arranged to be cut off except when a logical one occurs in the data stream. With the polarities shown, the gate A3 could be a NOR gate of the inverted type described above, or a conventional AND gate of the type which produces a pulse when and only when two positive pulses are applied to its input terminals. The input data may be synchronized with respect to the clock pulses produced by the oscillator 10 in a conventional manner, which does not form a part of the present invention, such that ground pulses representing logical ones in the data occur near the beginning of periods in which the output voltage A of the oscillator 10 is positive. Thus, the gate A3 will emit a pulse for each one in the data stream.

The output of the AND gate is applied to the set and reset gate input terminals *a* and *b* of a conventional flip-flop FF. The flip-flop FF may be of the conventional type well known in the art which requires a pulse applied to its set gate input terminal *a* and a predetermined voltage level applied to its set input terminal *c* to set the flip-flop to one of its stable states, and a pulse applied to its reset gate input terminal *b* and the predetermined voltage level applied to its reset input terminal *d* to reset it to the opposite state. As shown, its output terminals *e* and *f* are connected to the corresponding opposite input terminals in such a manner that an input pulse applied in parallel to its terminals *a* and *b* will set the flip-flop to the opposite state from the one in which it currently exists. Thus, a logical one occurring in the data stream applied to the gate A3 will change the state of the flip-flop FF.

The output terminals of the flip-flop FF are connected to the terminals *b* of the gates A1 and A2, such that one of these gates, depending on the state of the flip-flop, is always enabled, and one is always cut off. Since the flip-flop will change state once for each logical one in the input data, it will be seen that the gated voltage to the write amplifier 7 will be inverted in phase once for each logical one.

Figure 2:
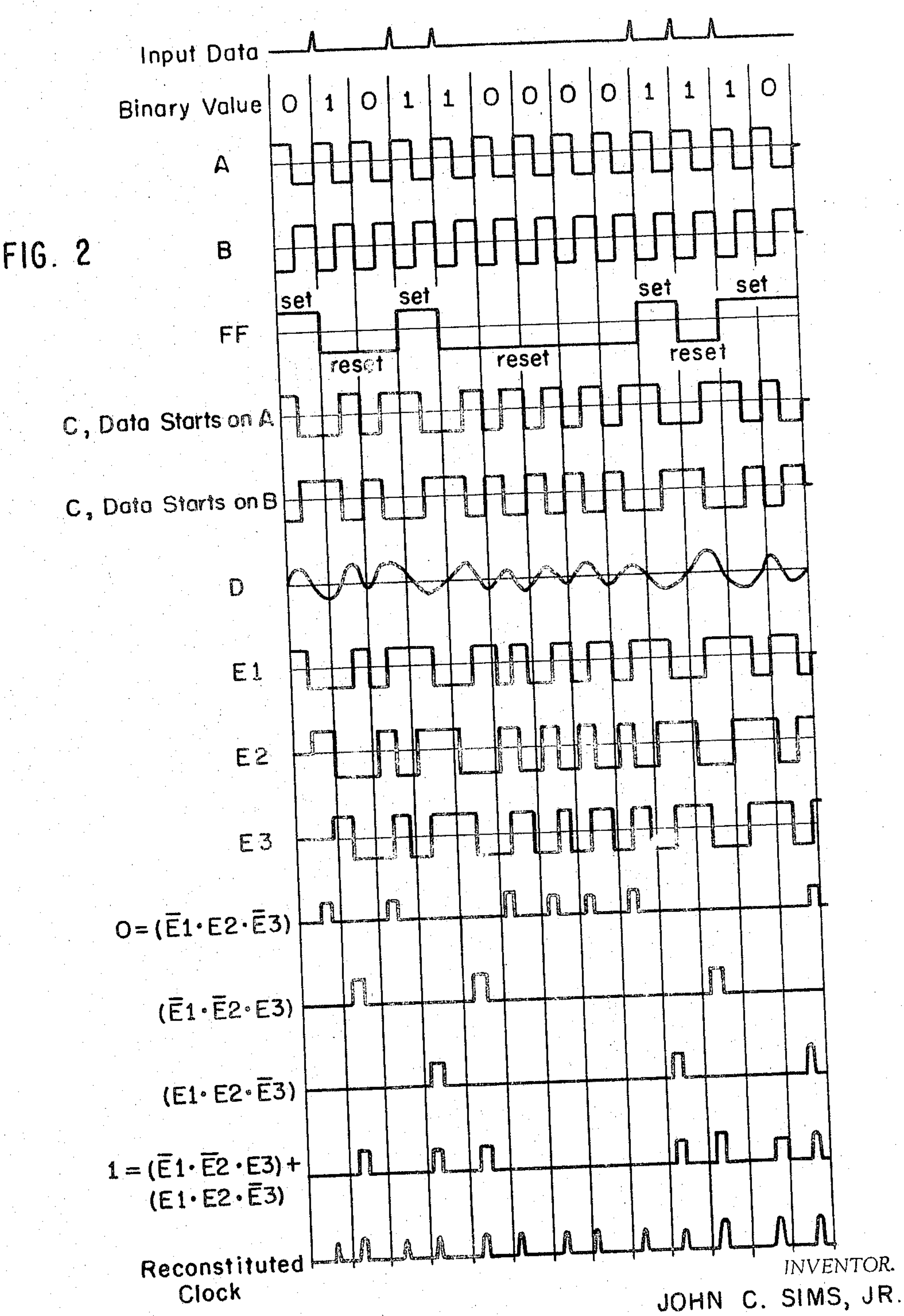
FIG. 2 is a graph showing typical waveforms produced in the apparatus of FIG. 1 in recording and reproducing information in accordance with my invention.

The output of the read amplifier 9, identified as a voltage E1 in FIGS. 1 and 2, is applied to a conventional inverter I2 to produce a voltage labelled $\overline{E1}$, 180 degrees out of phase with the voltage E1 and having the opposite logical truth value. The output of the amplifier 9 is also applied to one input terminal of each of two NOR gates A4 and A5, to be described. The output voltage of the inverter I2 is applied to a conventional delay line D1, which is selected to delay an applied signal by an amount greater than one-half the period of the signal voltage A and less than a whole period. In one practical embodiment of my invention, the delay of the unit D1 was 1.2 microseconds. The output of the delay line D1, identified as a voltage E2, is applied to a second delay line D2 to produce an output voltage $\overline{E3}$, delayed with respect to the voltage E1 by an amount greater than the delay of the first delay line but less than one period of the input voltage A. For example, a delay of 0.6 microseconds was employed in the embodiment of my invention discussed above in which the frequency of the voltage A was 500 kilocycles per second.

The voltage of the delay line D1 is also applied to an inverter I3 to produce an output voltage labelled $\overline{E2}$ which is 180 degrees out of phase with the voltage E2. Similarly, the output voltage of the delay line D2 is applied to the input terminals of an inverter 14 to produce a voltage E3 which is 180 degrees out of phase with the voltage $\overline{E3}$.

The voltages E1, $\overline{E2}$ and E3 are applied to a NOR gate A4 to produce an output voltage which is ground level when each of the applied input voltages is negative, and presents an effectively open circuit when any of the applied voltages is at ground. Thus, the NOR gate A4 responds as an AND gate to detect the complement of the input, using the convention that logical ones are represented by ground potential and logical zeros by a negative potential. Similarly, the voltages E1, E2, and $\overline{E3}$ are applied to the input terminals of a NOR gate A6. The output voltage of the gate A4 comprises a ground level once for each zero in the data train reproduced by the read amplifier 9. The output of the AND gates A5 and A6 are combined in a conventional OR gate OR2, which has its output terminals connected to the input terminals of a conventional inverter I5. The output of the inverter I5 will be a ground pulse for each logical one in the data stream reproduced by the read amplifier 9. If the gate OR2 does not invert, as if a pair of diodes is used, the inverter I5 may be omitted.

The output voltages from the AND gate A4 and the inverter I5 are combined in a conventional OR gate OR3 to produce an output pulse representing either a zero or a one in the reproduced data stream. By this arrangement, a reconstituted clock pulse stream is produced, which may be used in the manner known to the art for gating the signals from either the inverter I5 or the AND gate A4, or both, to apparatus for interpreting the data and utilizing it in any desired manner.

When required for gating purposes, either a logical zero or a logical one may be written at the beginning of each stream of data recorded on the disc 1, and detection of this bit at the output of the inverter I5 may be used to set a flip-flop, not shown, to control the operation of circuitry interpreting the output of the system.

Referring now to FIG. 2 in conjunction with FIG. 1, the manner of recording and reproducing information in accordance with my invention will next be described in connection with the operation of the apparatus of FIG. 1. In the following discussion, it will be assumed that the switches S1 and S2 are closed during the recording interval, and that the switches S2 and S3 are closed during the reproducing interval.

The operation of the apparatus will be illustrated by the recording and reproducing of a stream of data comprising the digital series 0101100001110. As indicated in FIG. 2, this data may be represented by a train of ground level pulses, one for each one in the data, and occurring at the start of the cycle of the clock stream A or B which is to be used to represent the data.

It does not matter whether the gate A1 or the gate A2 is enabled at the time the recording operation begins. Which gate is enabled at the beginning of the recording period is determined by the state in which the flip-flop FF was last set. If the data starts with the gate A1 enabled, the first zero will be represented by a cycle of the signal voltage A, and the first data one pulse occurring will switch the flip-flop FF to enable the gate A2 for the next cycle. The gate A2 will remain enabled for the next zero in the data stream. However, it will be disabled and the gate A1 enabled when the next one appears.

As shown in FIG. 2, the next one will also change the state of the flip-flop and return it to the state in which the gate A2 is enabled. If the data starts on phase B, it will be seen that the same waveform is produced but that it will be 180 degrees out of phase. Since the recording apparatus of my invention is sensitive to frequency and not to phase, this phase inversion will not affect the operation of the system. Therefore, the remainder of the discussion of operation will refer to the case in which the data starts on phase A, it being understood that all of the waveforms hereinafter discussed would be 180 degrees out of phase with those shown if the data started on phase B.

The output train C described above will be applied to the write amplifier 7 and recorded on the disc 1 by means of the transducer 6. When it is desired to retrieve this information, the switch S2 may be closed and the read amplifier will begin to interpret the data recorded on the desired track as soon as the appropriate shaft position code is read out by the photocells 5.

The signal D appearing on the output coil of the recording transducer 8 will be distorted in phase and magnitude in somewhat the manner indicated in FIG. 2. In addition, this signal and those to be described will have no particular phase relation to the recorded signals. The phase distortion is not removed, but the amplifier 9 squares the applied voltage and regulates its amplitude to produce an output voltage train E1 as shown in FIG. 2. It will be recognized that the voltage trains shown in FIG. 2 are schematic, and that the two conditions alternating to form the various signals could be "ground" and "open" as well as two different potentials.

The voltages E2 and E3 and their complements are now produced, the voltage E2 being delayed by six-tenths of a period of the voltage A with respect to the voltage E1, and the voltage E3 by being delayed by an amount equal to nine-tenths of the period of the voltage A. The signifiance of these delays will be apparent if it is considered that the net result of recording a zero in accordance with my invention is a cycle of voltage at the basic frequency, and the result of recording a one is the same as that of recording a half cycle of a voltage of one-half the frequency. Thus, if a train of ones is delayed by an amount equal to somewhat more than one-half the period of the voltage A, but less than a whole period, it will be delayed less than one-half a period of its own basic frequency. Therefore, for logical ones, the voltages E1, E2 and E3 will be in phase within one-half a period at the fundamental frequency, and for logical zeros, the voltages E2 and E3 will both be delayed by more than one-half a period with respect to the voltage E1. As the result of these relationships, for each logical zero in the data stream there will be a period of time in which the voltage E1 is negative, the voltage E2 is positive, and the voltage E3 is negative. This relationship may be represented logically, as indicated in FIG. 2, by the equation:

(1) $$0=(\overline{E1}\cdot E2\cdot \overline{E3})$$

In a similar manner, it may be shown that a logical one occurring in the data stream will result in one pulse, which occurs either when the voltages E1 and E2 are negative and the voltage E3 is positive, or when the voltages E1 and E2 are positive and the voltage E3 is negative. This condition is represented in FIG. 2 by the equation:

(2) $$1=(\overline{E1}\cdot \overline{E2}\cdot E3)+(E1\cdot E2\cdot \overline{E3})$$

The clock pulse is reconstituted by simply applying both of the zero and one outputs to the OR gate OR3.

The specific delays described for example are not essential to the practice of my invention, but are selected to take into account the expected amount of phase distortion which will occur within the basic criterion that E2 must be delayed by more than one-half but less than one period at the basic frequency, and E3 delayed more than E2 but less than one period.

While I have described my invention with respect to the details of a specific embodiment thereof, many changes and variations will become apparent to those skilled in the art upon reading my description, and such may obviously be made without departing from the scope of my invention.

Having thus described my invention, what I claim is:

1. In combination, means for producing a first alternating voltage having a first frequency and phase, means for producing a second alternating voltage having said first frequency and being 180 degrees out of phase with said first alternating voltage, magnetic recording means for recording an applied alternating voltage, first gate means responsive to an applied voltage of predetermined magnitude for applying said first voltage to said recording means, second gate means responsive to an applied voltage of said predetermined magnitude for applying said second voltage to said recording means, bistable means alternately operable by applied pulses between first and second states, means controlled by said bistable means for applying a voltage of predetermined magnitude to said first gate means in its first state and to said second gate means in its second state, and third gate means enabled synchronously with said first and second voltages and controlled by an applied series of pulses representing a selected truth value in a digital series for applying said pulses to said bistable means at the start of a cycle of said first and second voltages.

2. A modulator, comprising first and second gate means for producing an output voltage corresponding to an applied alternating voltage in response to an applied gating voltage, bistable circuit means connected to said gating means and alternately operable by a series of applied pulses back and forth between a first state and a second state for applying a gating voltage to said first gate means in said first state and said second gate means in said second state, means for applying a first alternating voltage of a first magnitude, frequency and phase to said first gate means, means for applying to said second gate means a second alternating voltage of said first magnitude and frequency and 180 degrees out of phase with said first alternating voltage, and means controlled by a series of information signals occurring in fixed phase relation to said first alternating voltage for applying a pulse to said bistable circuit means for each signal.

3. In combination, means for producing a first alternating voltage representing a sequence of binary signals, said voltage being of a predetermined fundamental period modulated by a phase inversion once for each occurrence of a binary signal of predetermined value in said sequence, delay means responsive to said first voltage for producing second and third voltages corresponding in waveform to said first voltage, said second voltage being delayed more than one-half and less than one fundamental period of said first voltage, said third voltage being delayed more than said second voltage and less than one fundamental period of said first voltage, and logic circuit means controlled by said first, second and third voltages for producing an output signal for each occurrence of a selected binary signal in said sequence.

4. The combination of claim 3, in which said logic circuit means comprises AND gate means for producing an output signal when and only when said first and third voltages are at a first level and said second voltage is at a second level.

5. The combination of claim 3, in which said logic circuit means comprises first AND gate means for producing an output signal when and only when said first and second voltages are at a first level and said third voltage is at a second level, second AND gate means for producing an output signal when and only when said first and second voltages are at said second level and said third voltage is at said first level, and means controlled by said gate means for combining their output signals to produce a signal for each signal produced by either gate means.

6. The combination of claim 3, further comprising second logic circuit means controlled by said first, second and third voltages for producing an output signal once for each fundamental period in said sequence.

7. The combination of claim 6, in which said second logic circuit means comprises means controlled by first, second and third voltages for producing an output signal when said first and second voltages are at the same level and said third voltage is at a different level and also when said first and third voltages are at a first level and said third voltage is at a second level.

8. In combination, magnetic recording means for recording a train of alternating voltage, modulating means responsive to a sequence of binary digital signals for applying to said recording means an alternating voltage of predetermined fundamental period modulated by a phase inversion once for each occurrence of a binary signal of predetermined value in said sequence, transducer means controlled by said recording means for reproducing said recorded voltage, delay means responsive to said reproduced voltage for producing second and third voltages corresponding in waveform to said reproduced voltage, said second voltage being delayed more than one-half and less than one fundamental period of said reproduced voltage, said third voltage being delayed more than said second voltage and less than one fundamental period of said reproduced voltage, and gating means controlled by the instantaneous polarities of said voltages for producing an output pulse when said instantaneous polarities are in a predetermined relationship.

9. Apparatus for decoding a first phase modulated alternating voltage in which binary bits of one value are represented by a full cycle at a first frequency and binary bits of an opposite value are represented by a half-cycle at one-half said first frequency, comprising delay means responsive to said first voltage for producing second and third voltages of the same waveform and delayed with respect to said first voltage by an amount less than the period corresponding to said first frequency and more than one-half the period corresponding to said first frequency, said third voltage being delayed more than said second voltage, and gating means responsive to the polarities of said voltages for producing an output signal when said polarities are in a predetermined relationship.

10. In a magnetic storage system; a magnetic recording surface; a magnetic recording transducer and a magnetic reproducing transducer mounted adjacent said recording surface; means for moving said surface relative to said transducers over a predetermined path; means for storing information in the form of digital signals recorded along said path, comprising means for producing a first alternating voltage signal of a first phase, magnitude and frequency, means for producing a second alternating voltage of said first magnitude and frequency and 180 degrees out of phase with said first signal, gating means responsive to a train of applied pulses for alternately supplying said first and second signals to said recording transducer, the signal supplied to said recording transducer being changed once for each applied pulse, and means responsive to a train of digital signals representing a series of logical truth values selected from the set comprising 1 and 0 for supplying a pulse to said gating means for each digital signal of a predetermined one of said truth values; and means for reproducing information stored on said magnetic surface along said path, comprising means responsive to the output of said reproducing transducer for producing a third alternating voltage signal corresponding to the signals recorded on said surface, delay means controlled by said third signal for producing a fourth alternating voltage corresponding in waveform to said third voltage and delayed by an amount greater than one-half but less than one period at said first frequency, delay means controlled by said third signal for producing a fifth alternating voltage corresponding in waveform to said third voltage and delayed by an amount greater than said fourth voltage and less than one period at said first frequency, and gating means controlled by the instantaneous polarities of said third, fourth and fifth voltages for producing an output signal when said polarities are in a predetermined relationship.

References Cited by the Examiner

UNITED STATES PATENTS

| | | | |
|---|---|---|---|
| 2,700,155 | 1/1955 | Clayden | 340—174.1 |
| 2,734,186 | 2/1956 | Williams | 340—174.1 |
| 2,917,726 | 12/1959 | Golden et al. | 340—174.1 |
| 3,237,176 | 2/1966 | Jenkins | 340—174.1 |

JAMES W. MOFFITT, *Acting Primary Examiner.*

A. I. NEUSTADT, *Assistant Examiner.*